June 28, 1966 R. A. HOPKINS 3,258,541

TELEPHONE CALL TRANSMITTER

Filed March 19, 1963 3 Sheets-Sheet 1

INVENTOR.
ROY A. HOPKINS

INVENTOR.
ROY A. HOPKINS

INVENTOR.
ROY A. HOPKINS

1

3,258,541

TELEPHONE CALL TRANSMITTER

Roy A. Hopkins, 2608 W. Santa Barbara Ave., Los Angeles, Calif.

Filed Mar. 19, 1963, Ser. No. 266,370
9 Claims. (Cl. 179—90)

Generally speaking, the present invention relates to the telephone art and, more particularly, pertains to an improved telephone call transmitter for transmitting telephone calls to any telephone receiver designated by a particular combination of symbols, usually of an alphanumeric type, although not specifically so limited. Also, usually the improved telephone call transmitter is equally as well adapted for receiving telephone calls from any other telephone call transmitter, although this is subsidiary to the main purpose of the present invention, which is not specifically limited thereby.

The improved telephone call transmitter of the present invention is of a type including pulsing or pulse-producing circuit interrupter means for connection to the telephone circuit going to a telephone exchange whereby each different symbol of a particular telephone call letter or number designation corresponding to a particular telephone which is to be called can be sensed by the telephone exchange as a function of the number of circuit interruptions.

In preferred forms of the present invention, said pulsing or pulse-producing circuit interrupter means is of any of several novel electrically energized types quite different from the conventional rotary dial, mechanically-energized type of circuit interrupter.

The pulsing or pulse-producing circuit interrupter means is arranged to be effectively energized for causing a desired number of circuit interruptions by operation of any of a plurality of push-buttons (or other switch means) which preferably bear, and/or have located closely adjacent thereto, corresponding symbol designations. This arrangement brings about appropriate energization of the pulsing or pulse-producing circuit interrupter means for causing effective circuit interruption in a manner corresponding to the symbol marking the push-button which has been operated to bring about said energization.

Therefore, it will readily be understood that a telephone call can be placed by merely appropriately depressing and releasing in sequence the proper push-buttons.

While this is somewhat similar to the prior art method of dialing a telephone number, it is vastly simpler since it does not require rotary spinning movement of the dial for each number or letter selected and since the arrangement of the present invention lends itself, in one preferred form, to positioning the plurality of push-buttons in a horizontally laterally sequentially linearly adjacent arrangement which is particularly advantageous from what may be termed the "human engineering" point of view.

In other words, said particular exemplary form of the invention provides such a lateral sequential array of push-buttons arranged in a manner similar to the positioning of piano keys, a row of typewriter keys, or the like, which is best suited, for psychological reasons, for quick and easy operation by a person. Furthermore, as previously pointed out, no mechanical spinning movement and return in the manner of a conventional prior art telephone dial is required, thus greatly simplifying a telephone calling operation.

Also, in one preferred form of the invention, the push-buttons are effectively illuminated whenever the telephone transmitter is removed from the cradle of the base portion preparatory to placing a telephone call. This makes it possible to quickly and easily select the appropriate push-buttons even though the entire room is dark. Such an arrangement is highly advantageous for use at night on a telephone stand or a bed stand in a region which is either very poorly illuminated or illuminated not at all.

2

In one specific preferred form of the invention, the illumination of the push-buttons is provided by transmitted light passing into, along, and/or through either transparent or translucent push-buttons having the symbol designations for placing telephone calls appropriately marked in a manner such as to provide a definite visual discontinuity or change of light transmission characteristics whereby to visibly distinguish the symbols in a very effective manner even though the overall illumination may be of relatively low value.

It should be noted that, while the preferred forms of the push-button operated telephone call transmitter of the present invention include electrically energizable motor means for effectively bringing about the desired operation of the pulsing or pulse-producing circuit interrupter means, the invention may, if desired, be adapted for push-button operation of mechanically energizable motor means for bringing about appropriate operation of the pulsing or pulse-producing circuit interrupter means in a manner such as to sequentially cause circuit interruptions in correspondence with the symbols marking the selected and operated push-buttons.

It is an object of the present invention to provide an improved telephone call transmitter of the general type broadly referred to above and/or of any of the various specific forms thereof referred to above.

It is a further object to provide an improved telephone call transmitter of the character referred to in the preceding object which, in addition to being operable by a plurality of push-buttons in an extremely simple manner, is caused to illuminate the symbols corresponding to the push-buttons whenever a telephone call is to be placed, and which includes novel pulsing or pulse-producing circuit means embodying numerous advantages.

It is a further object to provide an improved telephone call transmitter of the character referred to above which is of relatively cheap, simple, fool-proof, easy-to-operate and easy-to-maintain construction, and which is adapted for cooperation with conventional telephone exchange equipment whereby to be conducive to widespread use thereof.

Further objects are implicit in the detailed description which follows hereinafter for exemplary rather than limiting purposes and will be apparent to persons skilled in the art after a careful study thereof.

For the purpose of clarifying the nature of the present invention, several exemplary embodiments are illustrated in the hereinbelow-described figures of the accompanying drawings and are described in detail hereinafter.

FIG. 1 is a fragmentary perspective view of one exemplary embodiment of the present invention with the combination transmitter-receiver member resting on the cradle portion of the telephone and effectively inactivating same by reason of depression of the telephone-inactivating buttons positioned thereunder.

FIG. 2 is a fragmentary, partially broken away side view which is partly in elevation and partly in section, taken in the direction of the arrows 2—2 of FIG. 1 and illustrates the mounting of a typical one of the ten different push-buttons, including the showing of the corresponding normally open switch which is adapted to be temporarily closed by said push-button when it is digitally depressed, and also including the showing of the illumination means for illuminating the plurality of push-buttons when the combination transmitter-receiver member of FIG. 1 is lifted from the telephone cradle.

Figures 1, 2:
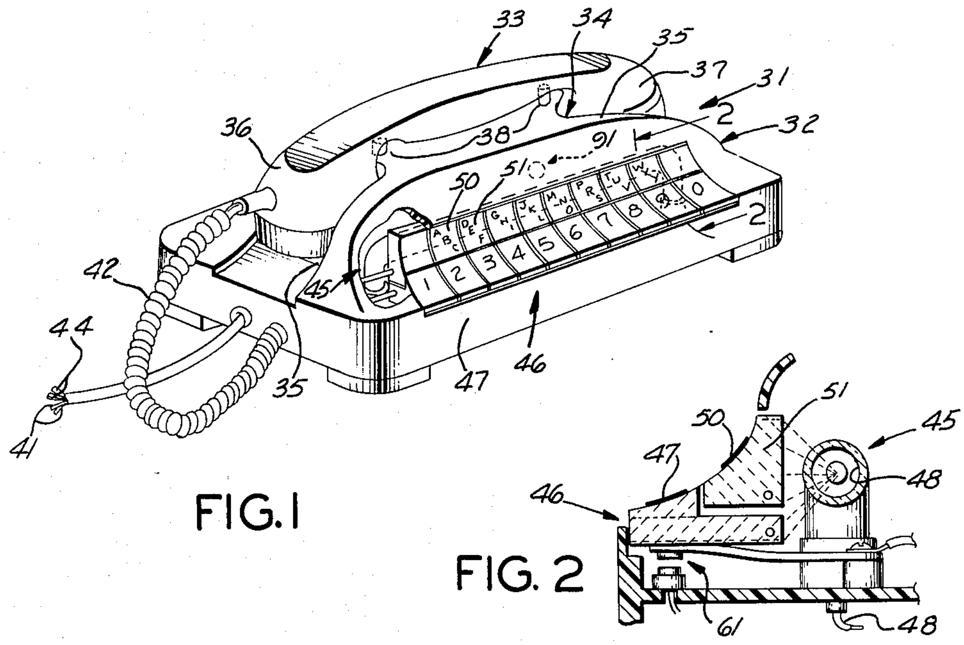
Figure 6:
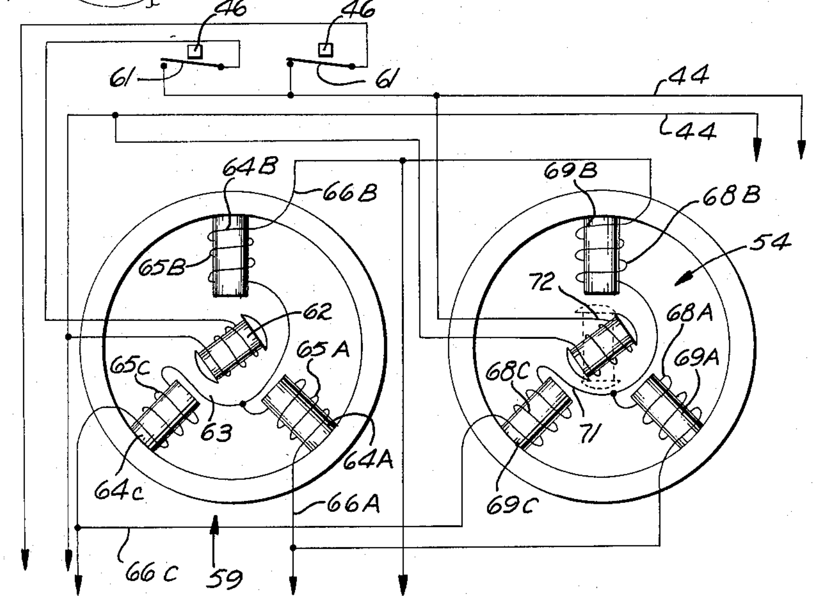

FIG. 6 is a partial or fragmentary electric circuit schematic view showing the connections of the energizing input lead means with respect to a typical one of the ten different position-controlling and position-determining means (which is shown in this view as comprising a master "synchro" generator), and showing its connections with respect to the common motor means (which is shown in this view as comprising a slave "synchro" motor) adapted to assume any rotary angular position corresponding to that of the rotor of any one of the "synchro" generators which is selectively energized by depressing the corresponding one of the ten push-buttons of FIG. 1. It should be clearly understood that the single position-controlling and position-determining means shown in FIG. 6 is typical of the other nine which are adapted to be connected in parallel with respect thereto and each of which is adapted to have a differently rotatively angularly fixedly positioned rotor therein.

Figures 4, 5:
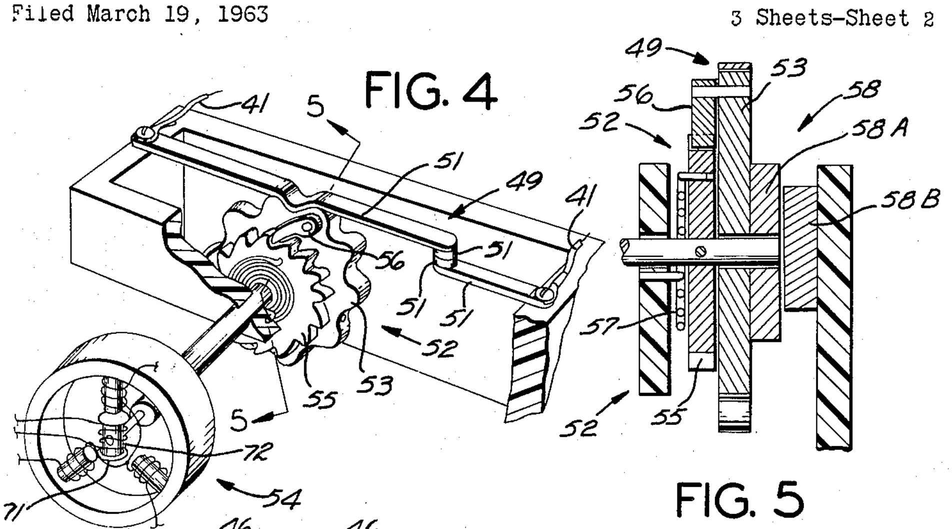
FIG. 4 is a fragmentary, partially broken away, perspective view illustrating the pulsing or pulse-producing circuit interrupter means which effectively pulses the main telephone circuit in a manner corresponding to the particular push-button of FIG. 1 which has been depressed.
FIG. 5 is a fragmentary side view taken in the direction of the arrows 5—5 of FIG. 4 and, in addition to showing the circuit interrupter in side elevation, also illustrates one optional, exemplary, and non-specifically limiting speed-controlling means taking the form of a magnetic or eddy current damper means. However, this is not to be construed as specifically limiting the invention thereto.
Figure 7:
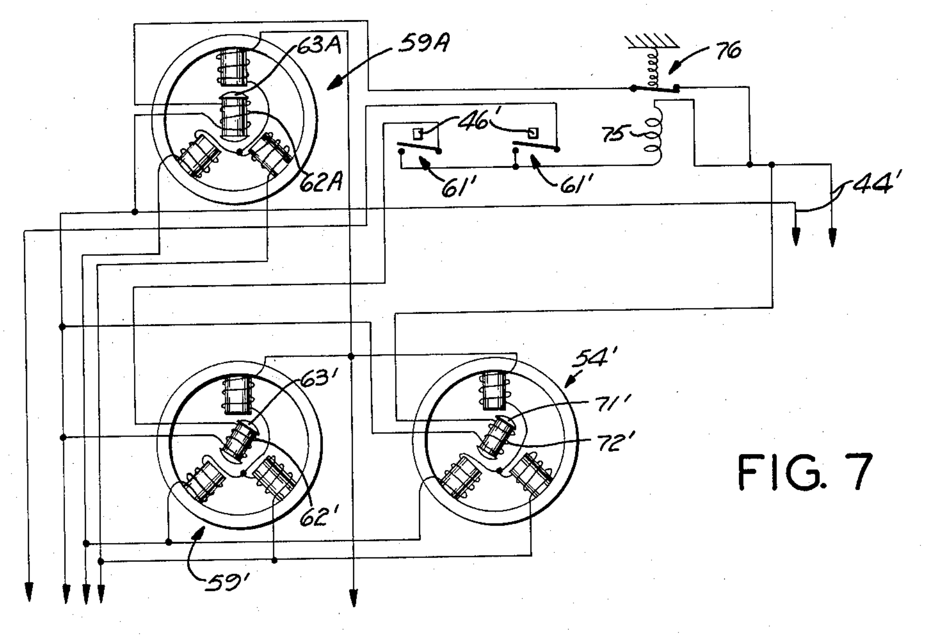

FIG. 7 is a fragmentary, partial circuit schematic view generally similar to a portion of FIG. 6 but illustrating a slight modification of the electric circuitry exemplified in FIG. 6 and arranged for connection to an additional or eleventh position-controlling and position-determining means or master "synchro" generator fully analogous to the ten exemplified by the showing of FIG. 6 but arranged to be energized and effectively connected with respect to the slave "synchro" motor whenever all of the other ten are de-energized, thus acting to replace the return spring shown in FIG. 4 by said eleventh master "synchro" generator.

Figure 8:
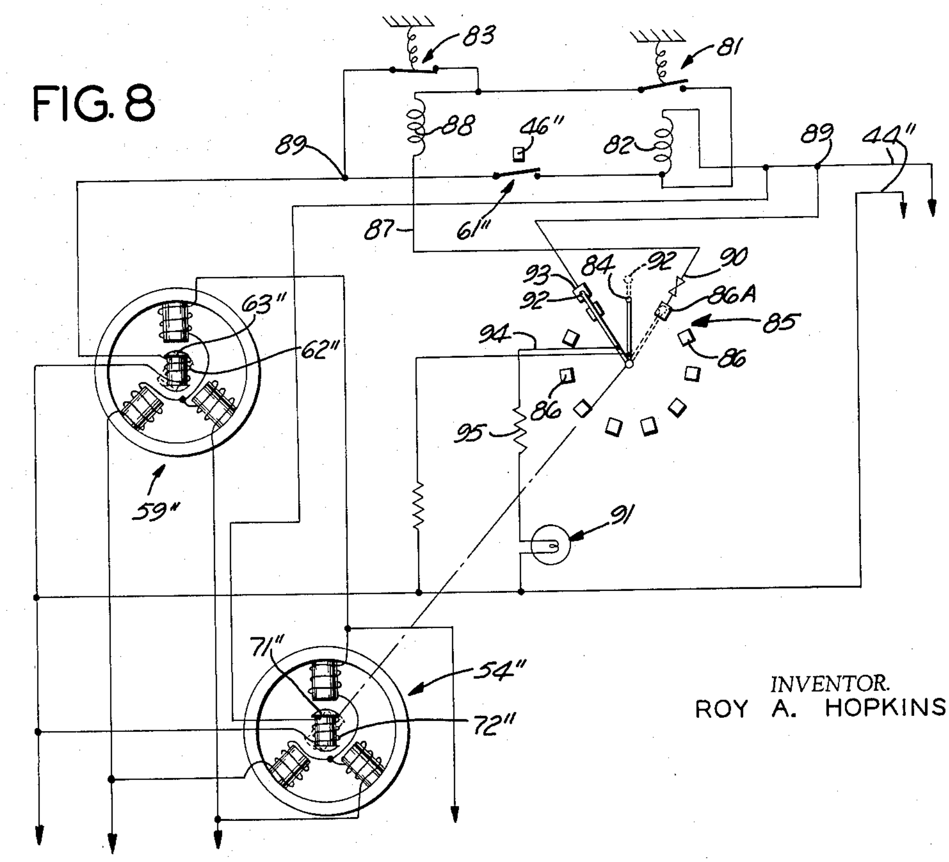

FIG. 8 is a fragmentary, partial circuit schematic view generally similar to FIGS. 6 and 7 but illustrating a slight modification of the invention.

Referring to FIGS. 1–6 for exemplary purposes, one exemplary embodiment of the invention takes a typical exemplary form wherein it comprises an improved telephone call transmitter, generally designated by the reference numeral 31, which comprises a base portion 32, a combination transmitter-receiver member, indicated generally at 33, normally adapted to be received on the cradle portion, indicated generally at 34, of the base 32 when the telephone is not in use.

It should be noted that the cradle portion, indicated generally at 34 in the form of the invention illustrated, actually comprises two recesses 35 at opposite ends of the base 32 and adapted to receive the transmitter portion 36 and the receiver portion 37 of the combination transmitter-receiver member 33 when the telephone is in the non-use position shown in FIG. 1. It should also be noted that, when in said non-use position shown in FIG. 1, said combination transmitter-receiver member 33 abuts switch-actuating or telephone-inactivating button means 38 in a manner such as to open the main switch means, indicated at 39 in the circuit schematic drawing comprising FIG. 3, whereby to normally maintain the main telephone voice-carrying circuit 41 open.

The combination transmitter-receiver member 33 is provided with a coiled electric cord means 42 extending therefrom into the base 32 in a conventional manner.

The base 32 is provided with main telephone circuit cord means 41 extending therefrom for connection to the customary wall fixture (not shown) and from there to the main telephone wire to the central telephone exchange in a customary manner.

Since the portions of the device which have been referred to above and certain portions of the electric circuitry of the device are conventional, no detailed description thereof will be set forth in this application. The detailed description which follows hereinafter will be directed primarily to the new and novel portions of the apparatus rather than to the old portions which are substantially conventional as to structure and mode of operation.

In the specific example illustrated in FIGS. 1–6 the main telephone circuit cord 41 is additionally provided with an energizing input lead means 44 adapted to be effectively connected to a source of electrical energy whereby to provide interior electrical energy within the base 32 for electrically energizing the position-controlling and position-determining means 59 and the operating motor means 54 which, in turn, is adapted to operate pulsing or pulse-producing circuit interrupter means 49 for placing telephone calls to selected numbers. These features will be described in greater detail hereinafter. Also the energizing input lead means 44 is adapted to electrically energize illumination means shown generally and diagrammatically at 45 in the circuit schematic illustrated in FIG. 3 and shown and described in greater detail hereinafter in connection with others of the figures illustrating the positioning and cooperation of said illumination means 45 with respect to the plurality of telephone-number-designating push-buttons, indicated generally at 46 (best shown in FIGS. 1 and 2), which will be described in greater detail hereinafter.

Figure 3:
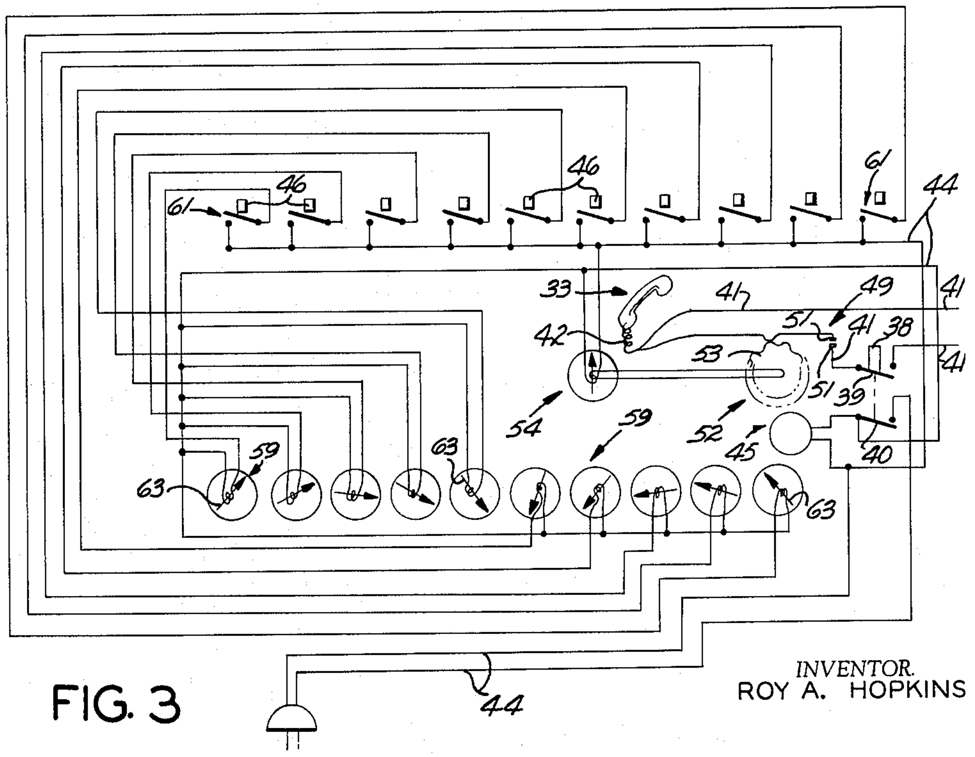
FIG. 3 is a partially schematic and partially diagrammatic view illustrating the various elements of the invention and the interconnecting electrical circuitry cooperating therewith for operating the entire system in accordance with the principles of the present invention. In this view, certain elements are shown in block diagram form for reasons of drawing simplification and clarity.

The arrangement is such that the illumination means 45 will illuminate the push-buttons 46 whenever the combination transmitter-receiver member 33 is lifted from the cradle 34 whereby to allow the switch-actuating button means 38 (which is spring-biased upwardly toward a switch-closed position) to be disengaged from an energizing switch means 40 shown in the circuit schematic illustrated in FIG. 3.

In other words, the push-buttons 46 will automatically be illuminated whenever the combination transmitter-receiver member 33 is lifted from the cradle 34 preparatory to placing a telephone call.

In the specific example illustrated, this is facilitated by reason of the fact that each of the push-buttons 46 is effectively made of a light-transmissive material, such as acrylic resin of the type commonly known as "Lucite," or the like, having what may be termed "a light piping" characteristic such that the edge illumination thereof by the gaseous discharge tube means 48 comprising the illumination means 45 will cause light to be received within each of the push-buttons 46 and to be retained therein by internal reflection until an optical discontinuity is reached, such as that provided by each of the numerical indicia 47 carried by the push-buttons 46 and/or by each of the alphabetical indicia 50 carried by the similar light-transmissive portions 51. The indicia 47 and 50 may be said to comprise an alpha-numeric set of symbols and may be painted or demarked in any desired manner having different light transmission characteristics from the background material such as to be clearly visible when illuminated by the gaseous discharge tube means 48.

While the illumination arrangement just described is highly advantageous, the invention is not specifically so limited and various other illumination arrangements functionally equivalent thereto may be employed.

It should be noted that, in the preferred form of the invention illustrated in FIGS. 1–6, the push-buttons 46 are arranged in a horizontally laterally sequentially linearly positioned array, which is the optimum arrangement for easy operation. However, the invention is not specifically so limited in all forms of the invention, and variations of this arrangement are intended to be included and comprehended, although this is the preferred form of the invention.

The preferred form of the invention illustrated in FIGS. 1–6 includes, as previously mentioned hereinbefore, pulsing or pulse-producing circuit interrupter means for connection to the main telephone circuit 41.

In the specific example illustrated in FIGS. 1–6, as is best shown in FIGS. 4 and 5, said pulsing or pulse-producing circuit interrupter means is generally designated by the reference numeral 49 and comprises switch means, including the normally closed contacts 51, connected in the main telephone circuit 41 and further includes a rotary member, indicated generally at 52, positioned adjacent to the switch elements 51 whereby rotation of the rotary member 52 in one direction will cause intermittent opening and closing of the switch elements 51 by reason of intermittent abutment therewith of the rotatively angularly spaced cam portions 53.

The rotary member 52 is provided with operating motor means, indicated generally at 54, for rotating the rotary member 52 to a desired angular rotative displacement from an initial position corresponding to a desired number of actuations of the switch elements 51 and corresponding interruptions of the main telephone circuit 41.

In the specific example illustrated in FIGS. 1–6, the motor means 54 comprises a rotary inductor motor of a type known in the art as a "synchro" motor, which will be described in greater detail hereinafter, while the rotary member 52 includes a driving ratchet 55 one-way coupled to the cam member 53 by pawl or dog means 56, thus providing an arrangement whereby driving rotary movement of the "synchro" motor means 54 into a certain rotative angular position will cause corresponding rotation of the ratchet 55 and the cam member 53 so as to correspondingly open the normally closed contacts or switch elements 51 a number of times determined by the number of toothed cam portions 53 which sequentially abut the switch member 51.

The ratchet 55 is provided with a spiral spring 57 which opposes the rotative angular displacement provided by the "synchro" motor means 54 whereby, immediately upon de-energization of said motor means 54, said ratchet means 55 will return to its initial position, but will not return the toothed cam portion 53 at the same time since they are not effectively coupled in the reverse direction of rotation. The spring 57 (or other one-way stop means) prevents the ratchet means 55 from counterclockwise rotation beyond its starting position.

Of course, the ratchet 55 and the toothed cam member 53 may be coupled by the pawl 56 in the opposite direction so rotative operation of the toothed cam means 53 will occur when the spiral spring 57 returns the ratchet 55 to its initial position. This is merely an alternative arrangement to that already described and is functionally substantially equivalent thereto.

If desired, speed-controlling means such as the magnetic or eddy current damper means indicated at 58 (including the rotary magnetic means 58A and the fixed electrically conductive means 58B, or vice versa) may be employed for preventing the toothed cam portion 53 from rotating too rapidly and causing the normally closed contacts or switch elements 51 to open and close too rapidly for the conventional telephone exchange equipment. This is only necessary where conventional telephone exchange apparatus is employed. If high-speed apparatus is employed, then speed-controlling or speed-limiting means, such as the damper means 58, need not be employed.

The invention also includes individual position-controlling and position-determining means associated with each push-button 46 for determining, controlling, and selecting a position of the corresponding rotary means 52 angularly rotatively displaced from its initial position a predetermined amount characteristic of that particular push-button 46 and for correspondingly electrically causing energization of the rotary motor means 54 until it has rotated said rotary means 52 into said selected position, and for terminating said electrical energization at that time.

In the specific exemplary form of the invention illustrated in FIGS. 1–6, each of said individual position-controlling and position-determining means is of the same type, such as designated by the reference numeral 59; one of said means 59 being described in detail hereinafter since the remainder are substantially identical and require no further description.

The position-controlling and position-determining means 59 associated with each push-button 46 comprises normally open switch means 61 connected between the energizing input lead means 44 and a coil 62 mounted on a prepositioned fixed master rotor member 63, which is positioned within field core means 64A, 64B, and 64C carrying corresponding field windings 65A, 65B, and 65C having three leads 66A, 66B, and 66C which connect to corresponding similar field windings 68A, 68B, and 68C carried by similar field core means 69A, 69B, and 69C positioned around a similar but non-fixed and rotatably mounted slave rotor 71 carrying a coil 72 similar to the coil 62 and similarly connected in parallel to the energizing lead means 44 and shunting normally open switch means 61.

It should be noted that the second-mentioned field windings 68A, 68B, and 68C carried by the second field core means 69A, and 69B, and 69C and the winding 72 carried by the slave rotor 71 all effectively comprise the previously-mentioned electrically energizable motor means 54.

It should be noted that each of the leads 66A, 66B, and 66C from the corresponding field windings 65A, 65B, and 65C of each of the individual position-controlling and position-determining means 59 (corresponding to each of the push-buttons 46) is similarly connected in parallel to the corresponding field windings 68A, 68B, and 68C of the "synchro" motor means 54 whereby any one of the individual position-controlling and position-determining means 59 (all of which are of a type which may be termed "synchro" generator means) which has its individually and distinctively differently fixedly pre-positioned master rotor coil 62 energized by closure of the corresponding switch means 61 by digital operation of the corresponding push-button 46, will cause the slave rotor 71 to rotate into a rotatively angularly displaced position corresponding to that of said *fixed* master rotor member 63 of said corresponding one of the ten different position-controlling and position-determining "synchro" generator means, indicated generally at 59. All other position-controlling and position-determining means 59 will be ineffective, since the corresponding switch means 61 will be open.

In this connection, it should be noted that the arrangement shown in FIGS. 1–6 is such that each of the master rotors 63 is initially fixedly positioned in a differently angularly rotatively displaced relationship with respect to all others whereby to provide ten different positionings thereof for the corresponding ten different position-controlling and position-determining means. This is best shown in FIG. 3, where said ten differently and fixedly positioned master rotors are indicated schematically by the headed arrows 63 and where the three field windings 65A, 65B and 65C, and the three wires 66A, 66B and 66C interconnecting them in parallel, as shown partially in FIG. 6, are eliminated for drawing clarity and simplification.

FIG. 7 illustrates, in partial fragmentary form, a slight modification of the first form of the invention wherein the return spiral spring 57 is eliminated from the "synchro" motor means 54 of the first form of the invention, and instead an additional or eleventh "synchro" generator means 59A of the same type as each of the ten illustrated at 59 in the first form of the invention is provided and has its master rotor member 63A in an initial fixed position different from the different fixed positions of all of the other master rotor members 63 of the first form of the invention. Also, in this modification, all of the normally open parallel switch means 61′ are connected in series with respect to the relay coil 75 which controls the opening and closing of a normally closed switch 76, which is connected to the lead means 44′ in parallel to the normally open switches 61′ and to the coil 62A on the eleventh master rotor 63A, whereby the releasing of any given push-button 46′ will automatically energize the coil 62A of said additional or eleventh master rotor 63A whereby to cause the slave rotor 71′ of the motor means 54′ to return to a corresponding *initial* position.

It should be noted that, in this modification, only portions of the device are shown since the remaining portions are similar to those illustrated in the first form of the invention. Similar portions in this modification are indicated by similar reference numerals, primed, however.

FIG. 8 illustrates a further modification of the invention provided with means for preventing the too rapid operation of the push-buttons 46″ from interfering with the full rotary positioning of the motor means 54″ in correspondence with the operation of each individual push-button 46″. In the specific exemplary and non-specifically limiting form of this version of the invention illustrated in FIG. 8, the above-mentioned features are provided by including a normally open holding switch means 81 arranged to be closed by relay coil means 82 when the switch 61″ is closed by operation of the corresponding push-button 46″. This closure of the holding switch means 81 effectively connects one of the lead means 44″, by way of the normally closed interrupter switch means 83, with respect to the position-controlling and position-determining means 59″ and with respect to the operating motor means 54″ in the manner referred to hereinbefore in connection with the first form of the invention illustrated in FIGS. 1–6 and described in detail hereinbefore and in connection with the second form of the invention illustrated in FIG. 7 and described hereinbefore.

This circuit-closing operation will occur and will remain connected until the slave rotor 71″ of the operating motor means 54″ has rotated to an angular rotative position corresponding to the fixed prepositioned angular rotative orientation of the master rotor 63″. This will occur even though the corresponding push-button 46″ may be depressed only momentarily and released before the slave rotor 71″ of the operating motor means 54″ has completed its full rotative displacement. This is so by reason of the holding action of the relay coil 82 and the holding switch means 81 which effectively by-passes the switch means 61″ operated by the push-button 46″.

Rotative displacement of the slave rotor 71″ of the operating motor means or slave "synchro" 54″ into the desired final position, will operate the wiper contact 84 of a rotary switch means, indicated generally at 85, including said rotary wiper contact 84 and ten rotatively equiangularly displaced fixed contact elements 86. When the rotary wiper contact element 84 reaches the particular contact element 86A which corresponds to the desired final position of the slave rotor 71″, the circuit 87 will be closed therethrough whereby to momentarily energize the interrupter relay coil 88. This will open the normally closed interrupter switch 83 momentarily and break the circuit through the holding relay coil 82 whereby to de-energize same and to cause the normally open holding switch means 81 to open up. This will break the energization of the fixed position master rotor 63″ and the slave rotor 71″ and will allow a return spring means, such as shown at 57 in FIGS. 4 and 5, to return the de-energized slave rotor 71″ to its normal initial position ready for the next subsequent energization by closure of the switch means 61″ as a result of momentary depression of the corresponding push-button 46″ in the same manner as described hereinbefore.

It will be noted that the return of the slave rotor 71″ to its normal initial position under the action of the return spring means, as shown at 57 in FIGS. 4 and 5, acts to move the rotary wiper contact element 84 out of electrical engagement with the stationary contact element 86A of the rotary switch means 85, thus breaking the circuit to the interrupter relay coil 88 and thus returning the entire apparatus to its initial condition suitable for the next subsequent operation as mentioned above.

The terminals 89 merely indicate where the connections are for connecting the next of the ten push-button operated switch means 61″, and the remainder of the circuit holding and interrupting means, with respect to the lead means 44″. In each of the other nine such cases, a lead similar to that shown at 90 in FIG. 8 will connect to a different one of the contact elements 86.

An indicator lamp 91, which may be physically small in size, is so connected to the circuitry of FIG. 8 as to be energized whenever the above-described sequence of operations has occurred and the slave rotor 71″ has returned to its initial position after having been rotatively angularly displaced as a result of momentary closure of the corresponding switch means 61″ by the corresponding push-button 46″. The energization of the indicator light 91, which is normally positioned at a visibly observable location on the phone housing such as that shown at 32 in the first form of the invention illustrated in FIG. 1, causes the user of the device to know that the apparatus is in condition for the next subsequent depression of a desired one of the ten push-buttons 46″ for closure of the corresponding switch means 61″ and corresponding rotative displacement of the corresponding slave rotor 71″ in the manner described hereinbefore and, therefore, not again detailed at this point.

The above-described action occurs, in the specific exemplary but non-specifically limiting form of the invention illustrated in FIG. 8, by reason of the inclusion of another rotary wiper contact element 92 which is completely insulated from the first-mentioned rotary wiper contact element 84 and which is adapted to electrically engage a fixed electrical contact element 93 when the slave rotor 71″ has returned to its initial position after having been rotatively angularly displaced as a result of momentary closure of the corresponding one of the ten switches 61″ by digital depression of the corresponding one of the ten push-buttons 46″. This second rotary wiper contact element 92 and the fixed electrical contact element 93 are connected in an electric circuit 94 which extends between the two leads of the electrical energizing input lead means 44″, in parallel with the rest of the circuitry described hereinabove, and having a current dropping means such as a resistor, inductor, or any other suitable current-dropping means, indicated at 95 in said circuit 94, for reducing the current and voltage applied to the above-mentioned indicator lamp means 91 so that it can be a very small lamp consuming a very small amount of power in its normal condition when it indicates that the apparatus is ready for push-button operation.

It should be noted that multiple stepping switch means operated by a rotary driver such as a "Ledex" rotary solenoid may be employed in lieu of the "synchro" generators and "synchro" motor means employed in the first form of the present invention. In such an arrangement, each of the push-buttons would control switch means for energization of such a "Ledex" rotary solenoid for causing it to rotate against the action of a return spring through a plurality of switch-closing contacts in sequence until the proper switching contact is achieved for de-energizing the coil of the "Ledex" rotary solenoid at which point it would stop and would then be returned to its initial position by the return spring action. This arrangement is functionally equivalent to the third form of the invention illustrated in FIG. 8 and described in detail hereinabove and, therefore, is thought to be broadly included and comprehended within the scope of the present invention and to not require specific detailed illustration and description for that reason.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An improved telephone call transmitter comprising: a housing portion provided with main telephone circuit means adapted to carry telephone messages and pulse-producing circuit interrupter means connected in said main telephone circuit means, and further provided with a plurality of different and individually controllably digitally operable position-controlling and position-determining means, each corresponding to a different one of a plurality of alpha-numeric symbols, and energizing electrical input lead means effectively connected to said plurality of position-controlling and position-determining means and with respect to said pulse-producing circuit interrupter means, which is common to all of said position-controlling and position-determining means; a plurality of normally open switch means carried within said housing portion and effectively connected with respect to said energizing input lead means, with respect to corresponding ones of said plurality of position-controlling and position-determining means, and with respect to said common pulse-producing circuit interrupter means; and a plurality of switch-closing digitally operable push buttons provided with, and corresponding to different ones of said plurality of alpha-numeric symbols and positioned for individual and sequential operation for corresponding closing actuation of the corresponding ones of said plurality of normally open switches.

2. Apparatus as defined in claim 1, wherein said pulse-producing circuit interrupter means comprises operating rotary motor means electrically coupled with respect to each of said position-controlling and position-determining means in slave relationship with respect thereto and with each of said position-controlling and position-determining means being in a master relationship with respect to said operating rotary motor means, a rotary member adapted to be rotated by said operating rotary motor means from an initial starting position and effectively provided with means for automatically returning it to said initial starting position upon de-energization of said operating rotary motor means, switch means positioned adjacent to said rotary member, and switch-opening and closing means effectively connected between said rotary member and said switch means for intermittent impulse-causing switch opening and closing actuation of said switch means of a repetitive extent which is a function of rotary angular displacement of said rotary member.

3. Apparatus as defined in claim 2, wherein each of said position-controlling and position-determining means comprises a rotary inductor generator of a master type and said operating rotary motor means of said common pulse-producing circuit interrupter means comprises a rotary inductor motor of a slave type adapted to assume a rotary angular position corresponding to any effectively energized and connected one of said master rotary inductor generators.

4. Apparatus as defined in claim 2, wherein each of said position-controlling and position-determining means comprises a rotary inductor generator of a master type and said operating rotary motor means of said common pulse-producing circuit interrupter means comprises a rotary inductor motor of a slave type adapted to assume a rotary angular position corresponding to any effectively energized and connected one of said master rotary inductor generators, each of said position-controlling and position-determining means including a fixed field distorting member and fixed field distorting coil means positioned in a different rotative angular relationship than any other one of said plurality of position-controlling and position-determining means, and exterior field means and coil means provided with exterior interconnecting lead means, said operating rotary motor means of said common circuit interrupter means being provided with a rotor member and rotor member coil means connected to the corresponding coil means carried by each of the different field distorting means of each of the plurality of position-controlling and position-determining means and also having exterior field means and coil means connected to identical similar coil means of the exterior field means of each of said plurality of position-controlling and position-determining means, said energizing input lead means being connected through the corresponding one of said normally open switch means, adapted to be operated by the corresponding one of said push-buttons, with respect to said rotor member coil means of said operating motor means and the corresponding field distorting means of the corresponding one of said plurality of position-controlling and position-determining means.

5. Apparatus as defined in claim 1, wherein said housing portion is provided with receiving cradle means, sound transducer means removably carried by said receiving cradle means, and switch-actuating means positioned for effective gravity-caused opening actuation of said main switch means when said sound transducer means is received and carried by said receiving cradle means, said energizing input lead means being provided with normally closed energizing switch means carried by said housing portion and positioned for effective opening actuation thereof by said main telephone circuit switch-actuating means when said sound transducer is received and carried by said receiving cradle means.

6. Apparatus as defined in claim 5, including illumination means positioned adjacent to said plurality of push-buttons for controllably illuminating same when the telephone is to be used, said illumination means being effectively energizably connected with respect to said energizing input lead means by way of said energizing switch means.

7. Apparatus as defined in claim 5, including illumination means positioned adjacent to said plurality of push-buttons for controllably illuminating same when the telephone is to be used, said illumination means being effectively energizably connected with respect to said energizing input lead means by way of said energizing switch means, said push-buttons being provided with different markings corresponding to the correlated symbols and being of material having an interior light transmission characteristic such as to transmit light received from said illumination means therethrough in a manner providing an illuminated showing, by visual contrast, of said different markings corresponding to said correlated symbols carried by said push-buttons.

8. Apparatus as defined in claim 5, including illumination means positioned adjacent to said plurality of push-buttons for controllably illuminating same when the telephone is to be used, said illumination means being effectively energizably connected with respect to said energizing input lead means by way of said energizing switch means, said push-buttons being provided with different markings corresponding to the correlated symbols and being of material having an interior light transmission characteristic such as to transmit light received from said illumination means therethrough in a manner providing an illuminated showing, by visual contrast, of said different markings corresponding to said correlated symbols carried by said push-buttons, said illumination means comprising edge illumination lamp means in juxtaposition to edges of said light-transmissive push-buttons whereby to provide interior light-transmissive illumination thereof.

9. Apparatus as defined in claim 1, wherein said plurality of push-buttons are carried by said housing portion in a normally upwardly biased and controllably downwardly deflectable position and are horizontally laterally sequentially linearly arranged with respect to one another along a front part of said housing portion.

No references cited.

ROBERT H. ROSE, *Primary Examiner.*

S. J. BOR, *Assistant Examiner.*